Patented Mar. 29, 1949

2,465,901

UNITED STATES PATENT OFFICE 2,465,901

BUTADIENE EMULSION POLYMERIZATION IN THE PRESENCE OF LEVOPIMARIC ACID-MALEIC ANHYDRIDE ADDITION PRODUCT

Forrest L. McKennon and Ray V. Lawrence, New Orleans, La., assignors to the United States of America as represented by the Secretary of Agriculture No Drawing. Application October 18, 1946, Serial No. 703,974

14 Claims. (Cl. 260—83.7)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to the copolymerization of butadiene-1,3 hydrocarbons with styrene.

The objects of this invention are, in general, the provision of a method whereby butadiene-1,3 hydrocarbons and styrene may be copolymerized in an aqueous emulsion to yield synthetic rubbers of increased tensile strength and elongation, with improved tack and milling characteristics, and, in general, to yield products which closely resemble natural rubber.

The formation of an elastomeric product resembling natural crude rubber by the copolymerization of butadiene-1,3 hydrocarbons with styrene in an aqueous emulsion containing a mercaptan modifier and peroxide catalyst is well known. The copolymers so formed are usually inferior to natural rubber in several characteristics, such as tensile strength, elongation, milling characteristics and tack.

We have found that when the copolymerization of butadiene-1,3 and styrene is carried out in an aqueous emulsion, an improved copolymer having a higher tensile strength, increased elongation and improved milling characteristics is formed by the addition of from 0.01 to 3% (based on the weight of monomers used) of the sodium or potassium salt of the addition product of levopimaric acid and maleic anhydride, of the formula $C_{24}H_{32}O_5$, to the aqueous soap solution used for the emulsion polymerization. While improved products have been prepared by using from 0.01 to 3% of the sodium or potassium salt of the addition product of levopimaric acid and maleic anhydride, based on the weight of monomers used, the optimum concentration was found to be from about 0.2% to 1% based on the weight of monomers.

The addition product of levopimaric acid and maleic anhydride is known to have three potentially available acid groups capable of reacting with sodium hydroxide under the proper conditions, thus giving rise to at least 3 possible sodium salts. Since the sodium or potassium salt is used in this invention in an aqueous soap solution, the particular sodium salt used is not critical as long as the pH of the aqueous soap solution is held within the proper range to provide good emulsification of the monomers. This pH range is about 8.5 to 10.5. However, the salt which is formed when the addition product of levopimaric acid and maleic anhydride is saponified in an aqueous or alcoholic solution containing more than three mols of sodium or potassium hydroxide per mol of the addition product of levopimaric acid and maleic anhydride has been found to be a convenient and efficacious product to use.

The addition product of levopimaric acid and maleic anhydride is known to be identical with the product formed when maleic anhydride is heated with abietic acid. Therefore, products prepared by heating maleic anhydride with either wood or gum rosin operate satisfactorily in this process after such products have been properly purified and refined, and it is to be understood that wherever the addition product of levopimaric acid and maleic anhydride is mentioned herein, the addition product of abietic acid and maleic anhydride is also included, and vice versa. We prefer, however, to use the product prepared in accordance with the process described in United States Patent No. 2,359,980.

The addition product of levopimaric acid and maleic anhydride may be added directly to the aqueous soap solution or it may be mixed with the materials from which the soap is to be prepared, i. e., alkali, fatty acid or stabilized rosin acids, and taken into solution during the preparation of the emulsifying agent, or the sodium or potassium salt of the addition product of levopimaric acid and maleic anhydride may be dissolved in the aqueous solution used for the emulsion polymerization. When a rosin soap is to be used as the emulsifying agent, the maleic anhydride addition product can be prepared from the rosin and allowed to remain in solution in the rosin, and the sodium salt of this product can then be used in the emulsion polymerization. The addition product of levopimaric acid and maleic anhydride may be employed in the emulsion polymerization of butadienes-1,3, by which is meant butadiene-1,3 and its homologs, such as isoprene (2-methyl-butadiene), 2,3 dimethyl butadiene-1,3, and piperylene, either alone or in admixture with other unsaturated compounds polymerizable therewith known as comonomers, such as styrene and its homologs and analogs and other aryl olefins.

This invention is not to be limited to any particular formula for polymerization since numerous modifications will be obvious to anyone skilled in the art. Thus, for emulsification, any of the commonly used emulsifying agents, such as hydrogenated fatty acid soaps, dehydrogenated rosin soaps and hydrogenated rosin soaps may be used and the catalyst or mercaptan modifying agent may also be varied. The following examples illustrate, but do not limit, the scope of this invention.

EXAMPLE 1

Samples of synthetic rubbers were prepared by a method similar to that described by Charles F. Fryling, Ind. Eng. Chem., Anal. Ed., 16, 1, (1944).

The recipe listed below was used for the preparation of the copolymers.

| | | |
|---|---|---|
| Butadiene-1,3 | grams | 7.50 |
| Styrene | do | 2.50 |
| Mercaptan modifier | do | 0.05 |
| Water | do | 18.00 |
| Sodium soap of hydrogenated fatty acids | do | 0.54 |
| Potassium persulfate | do | 0.03 |
| Sodium salt of addition products of levopimaric acid and maleic acid anhydride | | varied |
| Temperature | °C | 50 |

The sodium salt of the addition product of levopimaric acid and maleic anhydride in the amount of 0.018 gram was dissolved in the 18 grams of water and allowed to react at 50° C. under gentle agitation for 14 to 16 hours. The reaction was stopped when a yield of about 8.44 grams of hydrocarbon polymer (including fatty acids present) was obtained. The coagulated rubber was dried and then compounded and evaluated in the following conventional tread stock formula:

| | Parts |
|---|---|
| Rubber | 100.00 |
| Sulfur | 2.25 |
| Accelerator | 1.50 |
| Zinc oxide | 5.00 |
| Carbon Black | 50.00 |
| Softener | 5.00 |

The milling and tack characteristics of the rubber were greatly improved over those prepared with fatty acid soaps alone. A series of cures was made at 280° F. The structural strength was then tested and it was found that the values for maximum tensile strength and ultimate elongation at the breaking point approached more nearly those of natural rubber and are considerably higher than control samples wherein no addition product had been used. These comparative results are shown in Table A below.

EXAMPLE 2

Same as Example 1, except that 0.09 gram of the sodium salt of the addition product was used.

EXAMPLE 3

Same as Example 1, except that 0.18 gram of the sodium salt of the addition product was used.

Table A

| | Sodium salt of the addition product of levopimaric acid and maleic anhydride | | Maximum Tensile Strength, p. s. i. | Ultimate Elongation, Per Cent | Shore Hardness |
|---|---|---|---|---|---|
| | Grams added to reaction mixture | Per cent based on wt. of monomers | | | |
| Control | 0 | 0 | 2,760 | 475 | 61 |
| Example 1 | 0.018 | 0.18 | 3,820 | 600 | 59 |
| Example 2 | 0.09 | 0.9 | 3,830 | 650 | 60 |
| Example 3 | 0.18 | 1.8 | 3,500 | 650 | 58 |

EXAMPLE 4

A sample of synthetic rubber was prepared in a manner similar to that in Example 1 except that 0.54 gram of a soap from disproportionated rosin was used in place of 0.54 gram of the fatty acid soap. Five parts of stearic acid were added to the sample on the mixing rolls, and a conventional tread stock formula used for evaluation. Data on typical cures are given in Table B. The vulcanizate thus obtained had better milling and tack characteristics and higher tensile strength and elongation than did the control wherein no addition product had been used.

EXAMPLE 5

Same as Example 4, except 0.09 gram of the addition product was used.

Table B

| | Sodium salt of the addition product of levopimaric acid and maleic acid anhydride | | Maximum Tensile Strength, p. s. i. | Ultimate Elongation, Per Cent | Shore Hardness |
|---|---|---|---|---|---|
| | Grams added to reaction mixture | Per cent based on wt. of monomers | | | |
| Control | 0 | 0 | 3,110 | 300 | 62 |
| Example 4 | 0.018 | 0.18 | 3,530 | 450 | 62 |
| Example 5 | 0.09 | 0.9 | 3,830 | 500 | 58 |

Having thus decribed our invention, we claim:

1. The process comprising copolymerizing 85 to 60 parts, by weight, of butadiene and 15 to 40 parts, by weight, of styrene in an aqueous emulsion containing an emulsifying soap and an alkali salt of the addition product of levopimaric acid and maleic anhydride.

2. In a process of forming a synthetic rubbery polymer from a butadiene-1,3 hydrocarbon in an aqueous emulsion, the improvement comprising carrying out the formation in the presence of an emulsifying soap and a member selected from the group consisting of the addition product of levopimaric acid and maleic anhydride and the alkali salt of such addition product.

3. In a process of copolymerizing a butadiene-1,3 hydrocarbon with styrene in an aqueous emulsion, the improvement comprising carrying out the copolymerization in the presence of an emulsifying soap and a member selected from the group consisting of the addition product of levopimaric acid and maleic anhydride and the alkali salt of such addition product.

4. In a process of copolymerizing a butadiene-1,3 hydrocarbon with a monomeric polymerizable aryl olefin in an aqueous emulsion, the improvement comprising carrying out the emulsion polymerization in the presence of an emulsifying soap and an alkali salt of the addition product of levopimaric acid and maleic anhydride.

5. The process of claim 4 in which the alkali salt is sodium salt.

6. The process of claim 4 in which the alkali salt is the potassium salt.

7. In a process of copolymerizing 2,3 dimethyl butadiene with styrene in an aqueous emulsion the improvement comprising carrying out the emulsion polymerization in the presence of an emulsifying soap and a member selected from the group consisting of the addition product of levopimaric acid and maleic anhydride and the alkali salt of such addition product.

8. In a process of copolymerizing isoprene with styrene in an aqueous emulsion the improvement comprising carrying out the emulsion copolymerization in the presence of an emulsifying soap and a member selected from a group consisting of an addition product of levopimaric acid and maleic anhydride and the alkali salt of such addition product.

9. A process described in claim 2, the emulsifying soap comprising an alkaline soap of a carboxylic acid.

10. The process of claim 2 carried out in the presence of a sodium soap of a hydrogenated fatty acid.

11. The process of claim 3 carried out in the presence of a rosin soap.

12. The process of claim 3 carried out in the presence of a sodium salt of disproportioned rosin.

13. In a process of copolymerizing a butadiene-1,3 hydrocarbon with a monomeric polymerizable aryl olefin in an aqueous emulsion, the improvement comprising carrying out the emulsion polymerization in the presence of an emulsifying rosin soap and an alkali salt of the addition product of levopimaric acid and maleic anhydride.

14. In a process of copolymerizing a butadiene-1,3 hydrocarbon with a monomeric polymerizable aryl olefin in an aqueous emulsion, the improvement comprising carrying out the emulsion polymerization in the presence of an emulsifying soap and an alkali salt of the addition product of levopimaric acid and maleic anhydride, there being present an amount equivalent to 0.01 to 3% of said salt, based upon the monomers.

FORREST L. McKENNON.
RAY V. LAWRENCE.

No references cited.